E. J. SWEENEY.
CLEVIS.
APPLICATION FILED SEPT. 22, 1911.

1,016,183.

Patented Jan. 30, 1912.

Witnesses
W. E. Smith
B. G. Richards

Inventor
Eugene J. Sweeney,
by Joshua R. H. Potts
his Attorney

UNITED STATES PATENT OFFICE.

EUGENE J. SWEENEY, OF ROCKFORD, ILLINOIS.

CLEVIS.

1,016,183. Specification of Letters Patent. Patented Jan. 30, 1912.

Application filed September 22, 1911. Serial No. 650,799.

*To all whom it may concern:*

Be it known that I, EUGENE J. SWEENEY, a citizen of the United States, and a resident of the city of Rockford, county of Winnebago, and State of Illinois, have invented certain new and useful Improvements in Clevises, of which the following is a specification.

My invention relates to improvements in clevises of that type used as a draft coupling in agricultural implements, vehicles or the like, the object of the invention being to produce a device of this character which shall be simple of construction, easy of manipulation and efficient in operation.

The invention consists in the combinations and arrangements of parts hereinafter described and claimed.

Figure 1:
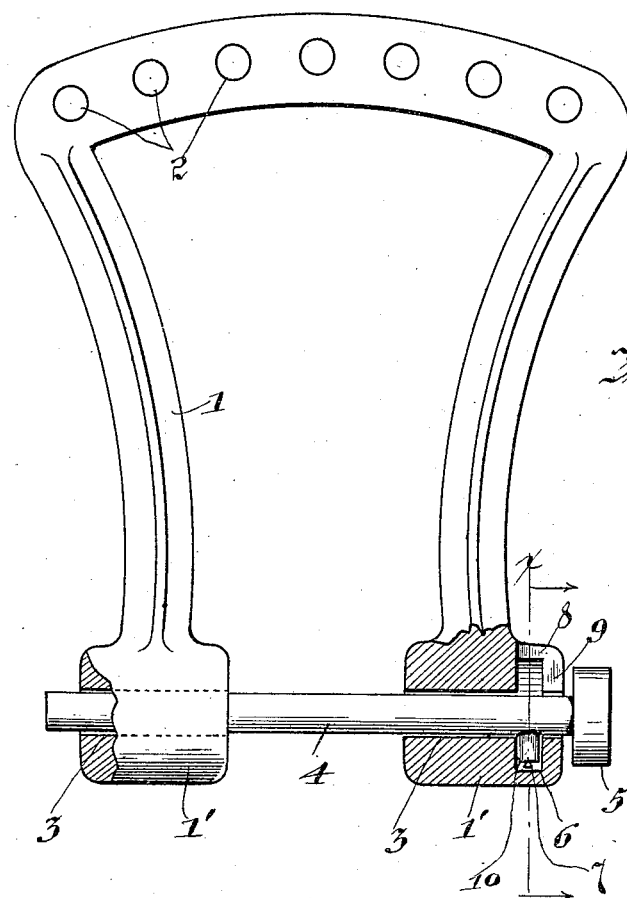
Figure 2:
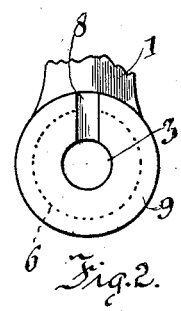
Figure 3:
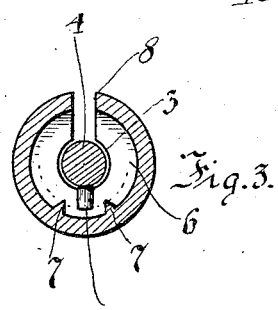

The invention will be best understood by reference to the accompanying drawing forming a part of this specification and in which, Figure 1 is a plan view of a clevis embodying my invention, Fig. 2 is a side elevation showing the conformation of that portion of the clevis which receives the locking pin, and Fig. 3 is a transverse section taken on line $x$—$x$ of Fig. 1.

The preferred form of construction as illustrated in the accompanying drawing comprises a yoke 1 having a plurality of apertures 2 in the curved or bent portion thereof. The object of these apertures is to provide means for attaching draft appliances as will be readily understood by those skilled in the art. The extremities of the yoke 1 are somewhat enlarged as shown in Fig. 1 and are provided with apertures 3 disposed in axial alinement and through which a locking pin 4 is adapted to pass. The length of the locking pin 4 is such as to bridge the space between the extremities 1' of the yoke 1, there being a head 5 provided on said locking pin by means of which the same is readily manipulated for insertion or removal thereof. Formed in the aperture 3 in one of the extremities 1' is an annular recess 6, the same being disposed adjacent one side of said extremity as shown in Fig. 1. Formed in one side of the annular recess 6 is a pair of inwardly extending pointed projections 7 the same being spaced apart approximately thirty degrees. Diametrically opposite the projections 7 a longitudinal slot 8 is formed which extends from the annular recess 6 through the wall 9 which separates said annular recess from the side of the extremity 1'. In this manner a suitable clearance is provided for the entry of a pin 10 which projects radially from one side of the locking pin 4 as illustrated in Figs. 1 and 3. The radial length of the pin 10 is slightly greater than the radial distances of the points of the projections 7, this feature being indicated by dotted lines in Fig. 3, the pin 10 having some spring or resiliency whereby it may be sprung over the points 7 by applying suitable rotative power to the head 5.

The mode of operation is as follows: After the yoke 1 has been suitably positioned on the implement or vehicle to be drawn the locking pin 4 is then inserted in the apertures 3 and moved therein until the radial pin 10 comes into juxtaposition with the annular recess 6, whereupon the locking pin 4 is rotated one hundred eighty degrees, which movement effects the passing of the radial pin 10 by one of the inward projections 7. The resulting or locking position of the pin 4 is illustrated in Figs. 1 and 3. In order to remove the locking pin the same is rotated one hundred eighty degrees in either direction, whereupon the radial pin 10 comes into registration or juxtaposition with the longitudinal slot 8. The locking pin is now removed by withdrawing the same in a longitudinal direction.

A clevis of the construction set forth is simple and reliable in construction and efficient in operation.

While I have illustrated and described the preferred construction for carrying my invention into effect this is capable of variation or modification without departing from the spirit of the invention. I therefore do not wish to be limited to the exact details of construction set forth, but desire to avail myself of such variations and modifications as come within the scope of the appended claims.

Having described my invention what I claim as new and desire to secure by Letters Patent is:

1. The combination with an integrally formed yoke having apertures formed in the extremities thereof, of a locking pin adapted to bridge the opening between said extremities and to fit into said apertures, there being an annular recess formed in the wall of one of said apertures, and a projection on said locking pin adapted to register with said recess and to enter the same after said locking pin is positioned longitudinally in said apertures, substantially as described.

2. The combination with a substantially U-shaped yoke having enlarged extremities, there being cylindrical apertures formed in said extremities and disposed in axial alinement with each other, a cylindrical locking pin adapted to bridge the space between said extremities and to pass through the apertures thereof, there being an annular recess formed in the aperture of one of said extremities, a radial pin formed on said locking pin in such a position as to register with said annular recess after insertion of said locking pin, and a pair of inwardly extending projections provided in said recess between which said radial pin is adapted to be moved, thus forming an angular locking means, substantially as described.

3. The combination with an integrally formed yoke having a plurality of apertures provided in the bent portion thereof, there being cylindrical apertures formed in the free ends of said yoke and disposed in axial alinement with each other, an annular recess extending from the aperture formed in one of said ends, a pair of inwardly projecting points spaced apart from each other and projecting into said recess, there being a longitudinal slot provided diametrically opposite said points and extending through the wall separating said annular recess from the end of said end in which said annular recess is formed, and a locking pin having a radial projection formed thereon for entering said recess and the space between said points, substantially as described.

4. The combination with an integrally formed yoke having a plurality of apertures provided in the bend thereof, there being enlarged extremities provided on the yoke through which cylindrical apertures are formed and disposed in alinement with each other, a cylindrical locking pin having a head at one end and adapted to be passed through said apertures, there being an annular recess leading from the aperture in one of said extremities, a wall separating said recess from one side of said extremity in which the recess is formed, a radial pin provided on the cylindrical portion of said locking pin and adapted to enter said recess, there being a longitudinal slot extending from said recess through said wall providing clearance for said radial pin, and means comprising a pair of points coacting with said pin for locking said radial pin after being turned in said recess, substantially as described.

5. A clevis comprising a yoke having a plurality of holes in the bend thereof, there being enlarged extremities in said yoke provided with alining cylindrical apertures, the aperture formed in one of said extremities being provided with an annular recess, a locking pin adapted to be passed through said apertures and of a length sufficient to project laterally from said extremities, and a radial pin provided on said locking pin adapted to be inserted into said recess, there being a pin clearance slot extending into the latter, and upstanding points in said recess arranged to hold said pin in locked position substantially as described.

In testimony whereof I have signed my name to this specification in the presence of two subscribing witnesses.

EUGENE J. SWEENEY.

Witnesses:
WM. W. BENNETT,
A. T. JONES.

---

Copies of this patent may be obtained for five cents each, by addressing the "Commissioner of Patents, Washington, D. C."